No. 767,340.  
Patented August 9, 1904.

UNITED STATES PATENT OFFICE.

HENRY F. HILLER, OF SOUTH DARTMOUTH, MASSACHUSETTS.

BRAZING COMPOUND.

SPECIFICATION forming part of Letters Patent No. 767,340, dated August 9, 1904.

Original application filed November 2, 1903, Serial No. 179,507. Divided and this application filed May 12, 1904. Serial No. 207,573. (No specimens.)

*To all whom it may concern:*

Be it known that I, HENRY F. HILLER, a citizen of the United States, residing at South Dartmouth, in the county of Bristol and State of Massachusetts, have invented certain new and useful Improvements in Brazing Compounds, of which the following is a specification.

This invention relates to brazing compounds for hard-soldering cast-iron to cast-iron, wrought-iron, or steel, brass to copper, and other combinations of metals, and is compounded in two parts, a liquid portion and a dry portion. These are applied separately before the spelter is applied, spelter forming a third portion.

My compound works equally well for uniting dissimilar metals as with cast-iron alone.

To successfully braze cast-iron to cast-iron, it is necessary to prepare the surfaces to receive the flux, as it is for the flux to prepare the surfaces to receive the spelter. The liquid portion of my compound furnishes a successful leader for the flux, which will adhere to the surfaces of the metal very readily when heated to the required degree and after the application of the liquid.

The compound is used in the brazing of cast-iron, as follows: The iron is heated red-hot and allowed to cool. This burns off all grease and cleanses the surfaces thoroughly. Should the break be new and has not been handled, it will not be necessary to heat it. The surfaces may be cleaned with acid, but it is not as satisfactory as to heat the metal. After the parts to be brazed have been thoroughly moistened with the liquid portion of the compound they are placed in the forge and heated until they are hot enough to melt the flux, which is then added. After the flux has thoroughly entered the joint the spelter is added.

I make no claim in this specification to the process of brazing with this compound, as I have done so in a separate application filed by me November 2, 1903, Serial No. 179,507, this application being a divisional application thereof.

I do not claim that my compound must be formed of the exact proportions as herein given, for the several ingredients are liable to vary in their chemical strength and must be combined in varying proportions accordingly. The proportions given herein are the general proportions used for my compound—viz., boracic acid, one ounce; carminic acid, one-fourth ounce; carbonate of lime, one-fourth ounce; water, one quart, mixed for the liquid portion; boric-acid crystals for a flux, and brass-copper spelter in indefinite quantity.

What I claim is—

1. A brazing compound consisting of three parts, one part of boracic acid, carminic acid, carbonate of lime, and water, one part of boric-acid crystals, and one part of brass and copper thoroughly united by heat, forming a spelter.

2. A brazing compound containing boracic acid, carminic acid, and water; and a flux.

In testimony whereof I affix my signature in presence of two witnesses.

HENRY F. HILLER.

Witnesses:
 FREDERIC T. MAXFIELD,
 HARRY E. GIFFORD.